US009519767B2

(12) United States Patent
Kim

(10) Patent No.: US 9,519,767 B2
(45) Date of Patent: Dec. 13, 2016

(54) APPARATUS AND METHOD FOR AUTHENTICATING A COMBINATION CODE USING A QUICK RESPONSE CODE

(71) Applicant: Samsung Electronics Co., Ltd., Gyeonggi-do (KR)

(72) Inventor: Jung-Rim Kim, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 212 days.

(21) Appl. No.: 13/651,925

(22) Filed: Oct. 15, 2012

(65) Prior Publication Data
US 2013/0097684 A1 Apr. 18, 2013

(30) Foreign Application Priority Data

Oct. 14, 2011 (KR) .................. 10-2011-0105258

(51) Int. Cl.
*G06F 15/16* (2006.01)
*H04L 29/06* (2006.01)
*G06F 21/31* (2013.01)
*H04L 9/32* (2006.01)

(52) U.S. Cl.
CPC .................... *G06F 21/313* (2013.01)

(58) Field of Classification Search
USPC ......... 726/2–8; 713/168–174, 182–186, 202; 709/206, 225, 229, 249, 389
See application file for complete search history.

(56) References Cited

U.S. PATENT DOCUMENTS

| 8,296,558 | B1* | 10/2012 | Chowdhury | H04L 63/061 380/277 |
| 8,627,438 | B1* | 1/2014 | Bhimanaik | 726/9 |
| 2006/0168005 | A1* | 7/2006 | Kanbara et al. | 709/206 |
| 2008/0059372 | A1* | 3/2008 | Lee | G06Q 20/105 705/41 |
| 2009/0293110 | A1* | 11/2009 | Koga | 726/6 |
| 2010/0314861 | A1* | 12/2010 | Amidror et al. | 283/85 |
| 2011/0219427 | A1* | 9/2011 | Hito et al. | 726/3 |
| 2011/0307610 | A1* | 12/2011 | Hayashi | 709/225 |
| 2012/0124656 | A1* | 5/2012 | Senac | 726/9 |
| 2014/0197232 | A1* | 7/2014 | Birkler | G06F 21/313 235/375 |

* cited by examiner

Primary Examiner — Evans Desrosiers
(74) Attorney, Agent, or Firm — The Farrell Law Firm, P.C.

(57) ABSTRACT

An apparatus and a method are provided for authenticating a combination code using a Quick Response (QR) code. The apparatus includes a QR code receiver that receives an image frame including a QR code; a QR code recognizer that recognizes the QR code within the image frame; a combination code generator that generates a combination code including the QR code; and a combination code transmitter that transmits the combination code to an authentication server.

8 Claims, 5 Drawing Sheets

APPARATUS AND METHOD FOR AUTHENTICATING A COMBINATION CODE USING A QUICK RESPONSE CODE

PRIORITY

This application claims priority under 35 U.S.C. §119(a) to Korean Application Serial No. 10-2011-0105258, which was filed in the Korean Intellectual Property Office on Oct. 14, 2011, the entire content of which is hereby incorporated by reference.

BACKGROUND OF THE INVENTION

1. Field of the Invention

The present invention relates generally to a code authentication apparatus, and more particularly, to an apparatus and a method for authenticating a combination code generated by combining a Quick Response (QR) code and an authentication code.

2. Description of the Related Art

In general, an authentication system uses an authentication code notification through a short-text message service of a terminal. For example, when a user of a Personal Computer (PC) accesses a web page for an authentication, an authentication server transmits a short-text message including an authentication code for the authentication to a user terminal. Thereafter, the user retrieves the authentication code from the short-text message displayed on a screen of the user terminal, and inputs the received authentication code into an authentication code input window displayed on the PC. When the authentication server receives the input authentication code and identifies that the input authentication code matches the authentication code included in the transmitted short-text message, the user is authenticated.

As described above, the conventional art has a disadvantage in that when the short-text message including the authentication code is transmitted to the user terminal, the short-text message has high visibility and weak security because the authentication code is transmitted in text form through a single network.

Also, the conventional art is inconvenient in that the user has to input the authentication code included in the short-text message received by the user terminal to the web page again.

SUMMARY OF THE INVENTION

Accordingly, the present invention is designed to address at least the problems and/or disadvantages described above and to provide at least the advantages described below.

An aspect of the present invention is to provide an apparatus and a method for authenticating a combination code having a high security through recognition of an authentication number and a QR code included in a message, without an additional input by a user.

In accordance with an aspect of the present invention, an apparatus for authenticating a combination code using a QR code is provided. The apparatus includes a QR code receiver that receives an image frame including a QR code; a QR code recognizer that recognizes the QR code within the image frame; a combination code generator that generates a combination code including the QR code; and a combination code transmitter that transmits the combination code to an authentication server.

In accordance with another aspect of the present invention, a method of authenticating a combination code using a QR code in an authentication apparatus is provided. The method includes receiving an image frame including a QR code; recognizing the QR code within the image frame; generating a combination code including the QR code; and transmitting the combination code to an authentication server.

In accordance with another aspect of the present invention, a method of authenticating a combination code using a QR code in an authentication server is provided. The method includes receiving an authentication request; generating a QR code; transmitting the QR code to a user Personal Computer (PC); receiving a combination code; analyzing the combination code; outputting an authentication result based on the analyzing; and transmitting the authentication result to an authentication request server.

In accordance with another aspect of the present invention, an apparatus for authenticating a combination code using a QR code is provided. The apparatus includes a QR code generator that generates a QR code, when an authentication request is received; a QR code transmitter that transmits the QR code to a user Personal Computer (PC); a combination code receiver that receives a combination code; a combination code analyzer that analyzes the combination code and outputs an authentication result; and an analysis result transmitter that transmits the authentication result to an authentication request server.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described with reference to the accompanying drawings. In the following description and accompanying drawings, a detailed description of known functions and configurations incorporated herein will be omitted when it may make the subject matter of the present invention rather unclear.

Figure 1:
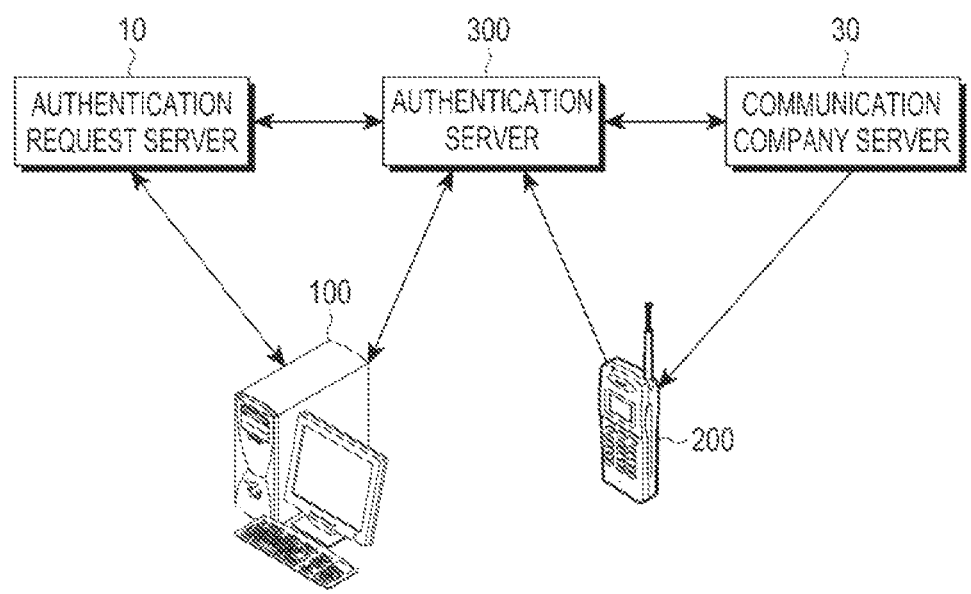
FIG. 1 illustrates an authentication system for performing a combination code authentication process according to an embodiment of the present invention.

FIG. 1 illustrates an authentication system for performing a combination code authentication process according to an embodiment of the present invention.

Referring to FIG. 1, the authentication system includes an authentication request server 10, an authentication server 311, a communication company server 30, a user PC 100, and a user terminal 200.

When the authentication request server 10 receives an authentication request and identification information of the user terminal 200 from the user PC 100, the authentication request server 10 sends a request for the authentication of the user terminal 200 to the authentication server 300. For example, the identification information of the user terminal 200 includes a phone number of the user terminal 200, and the identification information may be inserted in the request message from the user PC 100 or may be pre-registered in the authentication request server 10.

When the authentication request server 10 receives an authentication result from the authentication server 300, the authentication request server 10 transmits the received authentication result to the user PC 100.

Upon receiving an authentication request from the authentication request server 10, the authentication server 300 generates an authentication code and a QR code for the authentication. Thereafter, the authentication server 300 transmits a message including the generated authentication code to the user terminal 200 or transmits the generated authentication code to the communication company server 30. Further, the authentication server 300 transmits the generated QR code to the user PC 100.

Thereafter, when a combination code generated by combining the authentication code and the QR code recognized by the user terminal 200 is received, the authentication server 300 analyzes the combination code to output the authentication result. For example, the authentication server 300 analyzes the combination code to determine whether the combination code is generated by combining the generated authentication code and the QR code. When the combination code is generated by combining the generated authentication code and the QR code, the authentication server 300 outputs a successful authentication notification. When the combination code is not generated by combining the generated authentication code and the QR code, the authentication server 300 outputs an authentication failure notification.

The communication company server 30 generates a short-text message including the authentication code received from the authentication server 300 and transmits the generated short-text message to the user terminal 200.

The user PC 100 generates an authentication request message for the user terminal 200 and transmits the generated authentication request message to the authentication request server 10, wherein the generated authentication request message includes identification information of the user terminal 200. Thereafter, when the QR code is received from the authentication server 300, the user PC 100 displays the received QR code on a screen of the PC. When the authentication result is received from the authentication server 10, the user PC 100 displays the received authentication result on the screen of the PC.

When the user terminal 200 receives the message including the authentication code from the authentication server 300 or the communication company server 30, the user terminal 200 extracts the authentication code from the received message. Thereafter, when there is a QR code recognition request, the user terminal 200 receives an input of an image frame through a camera, and recognizes the QR code from the input image frame. For example, the QR code is recognized using software, such as an application for recognizing the QR code.

Thereafter, the user terminal 200 combines the extracted authentication code and the recognized QR code to generate the combination code. The user terminal 200 generates a message including the generated combination code and transmits the generated message to the authentication server 300.

Alternatively, the user terminal 200 may insert the extracted authentication code and the recognized QR code in the message and then transmit the message to the authentication server 300. The authentication server 300 combines the received authentication code and the QR code to generate the combination code and analyzes the generated combination code to output the authentication result.

As described above, according to an embodiment of the present invention, the user can perform a convenient and high-security authentication by recognizing the authentication code and the QR code included in the message and directly transmitting a combination code that is generated by combining the authentication code and the QR code to the authentication server, without an additional input by the user for the authentication.

Figure 2:
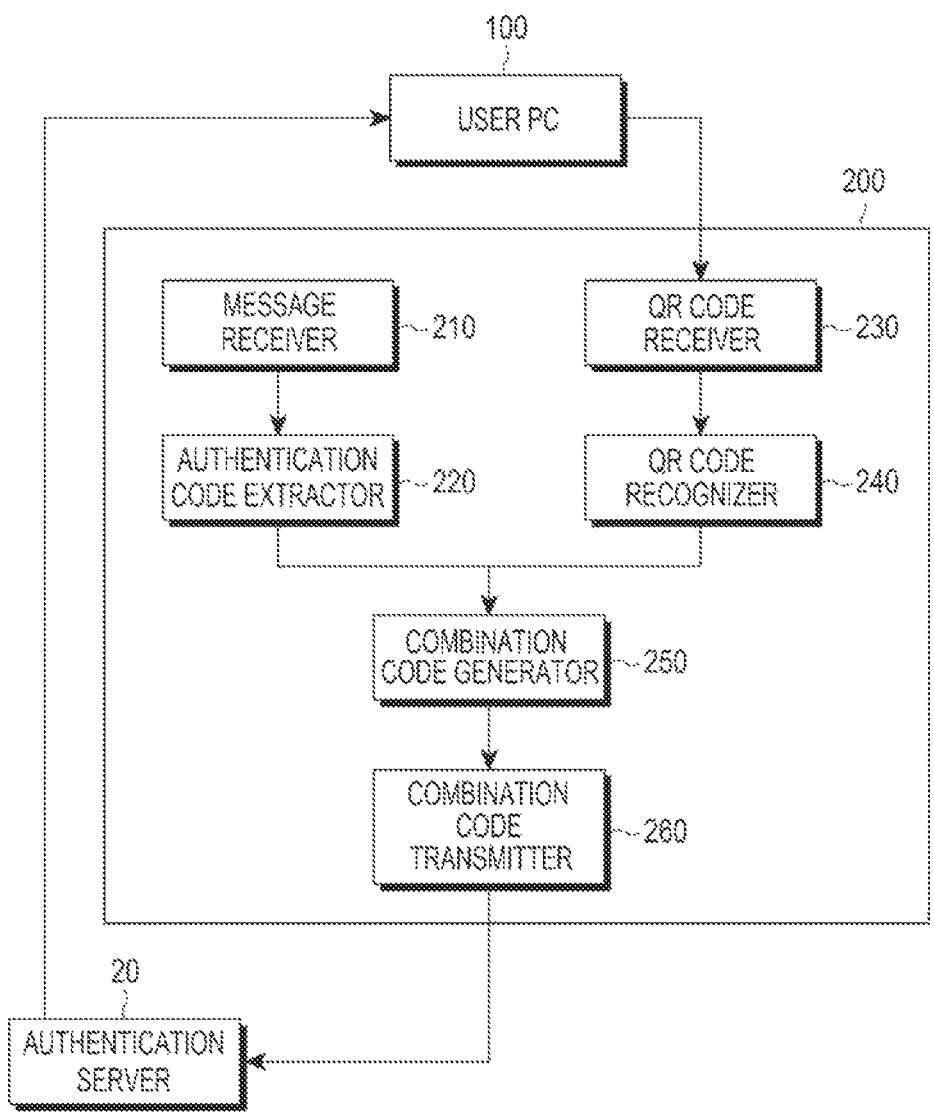
FIG. 2 illustrates a user terminal for performing a combination code authentication according to an embodiment of the present invention.

FIG. 2 illustrates a user terminal for performing a combination code authentication according to an embodiment of the present invention.

Referring to FIG. 2, the user terminal 200 includes a message receiver 210, an authentication code extractor 220, a QR code receiver 230, a QR code recognizer 240, a combination code generator 250, and a combination code transmitter 260. Each component in the user terminal 200 is embodied as hardware or a combination of hardware and software.

The message receiver 210 receives the message including the authentication code from the authentication server 300 or the communication company server 30.

The authentication code extractor 220 extracts the authentication code from the received message through the message receiver 210. For example, the message may be a short-text message, and the authentication code may be expressed in text form and then inserted into the message.

The QR code receiver 230 receives an image frame including the QR code input through a camera on the screen of the user PC 100.

The QR code recognizer 240 recognizes the QR code from the image frame.

The combination code generator 250 generates the combination code by combining the extracted authentication code and the recognized QR code.

The combination code transmitter 260 generates the message including the generated combination code and transmits the message to the authentication server 300.

As described above, according to an embodiment of the present invention, the user can perform a convenient and high-security authentication by recognizing the authentication code and the QR code included in the message and directly transmitting the combination code generated by combining the authentication code and the QR code to the authentication server, without an additional input by the user for the authentication.

Figure 3:
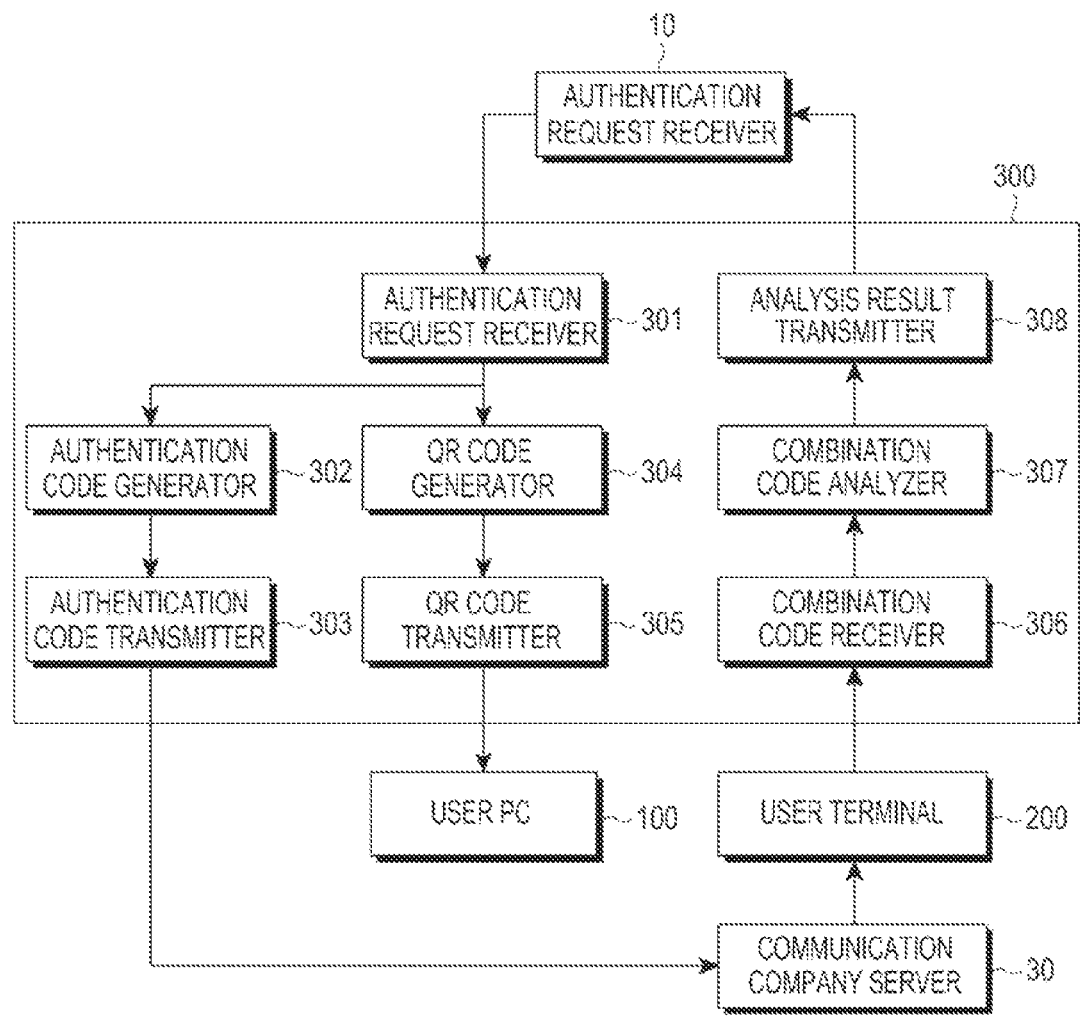
FIG. 3 illustrates an authentication server for performing a combination code authentication according to an embodiment of the present invention.

FIG. 3 illustrates an authentication server for performing a combination code authentication according to an embodiment of the present invention.

Referring to FIG. 3, the authentication server 300 includes an authentication request receiver 301, an authentication code generator 302, an authentication code transmitter 303, a QR code generator 304, a QR code transmitter 305, a combination code receiver 306, a combination code analyzer 307, and an analysis result transmitter 308. Each component in the authentication server 300 is embodied as hardware or a combination of hardware and software.

The authentication request receiver 301 receives an authentication request message including identification information of the user terminal 200 requiring the authentication from the authentication request server 10.

The authentication code generator 302 generates the authentication code for authenticating the user terminal 200.

The authentication code transmitter 303 inserts the generated authentication code in the message and then transmits the message to the communication company server 30 or the user terminal 200.

The QR code generator 304 generates the QR code for authenticating the user terminal 200.

The QR code transmitter 305 transmits the generated QR code to the user PC 100.

The combination code receiver 306 receives the combination code for the authentication from the user terminal 200.

The combination code analyzer 307 analyzes the received combination code and outputs the authentication result. Specifically, the combination code analyzer 307 identifies whether the received combination code is generated by combining the generated authentication code and the QR code, and outputs the authentication result. For example, the combination code analyzer 307 outputs an authentication success indicator as the result, when the received combination code is generated by combining the generated authentication code and the QR code, and outputs an authentication failure indicator as the result, when the received combination code is not generated by combining the generated authentication code and the QR code.

The analysis result transmitter 308 transmits the input authentication result to the authentication request server 10.

As described above, according to an embodiment of the present invention, the user can perform a convenient and high-security authentication by recognizing the authentication code and the QR code included in the message and directly transmitting the combination code generated by combining the authentication code and the QR code to the authentication server, without an additional input by the user for the authentication.

Figure 4:
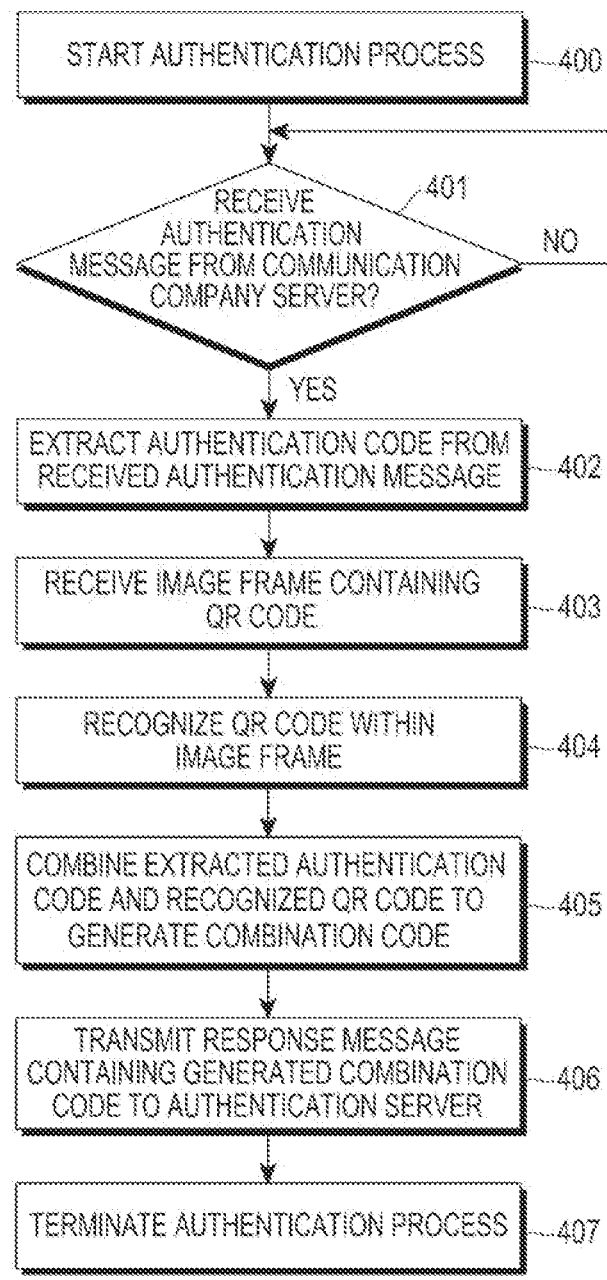
FIG. 4 is a flowchart illustrating a method for performing a combination code authentication in a user terminal according to an embodiment of the present invention.

FIG. 4 is a flowchart illustrating a method for performing a combination code authentication in a user terminal according to an embodiment of the present invention.

Referring to FIG. 4, when there is a request for an authentication process, the user terminal 200 starts the authentication process in step 400.

In step 401, the message receiver 210 determines whether an authentication message including an authentication code is received from the communication company server 310. When the authentication message is received, the authentication code extractor 220 extracts the authentication code from the received authentication message in step 402.

A QR code recognition application including the QR code receiver 230 is automatically executed to recognize the QR code transmitted to the user PC 100, and the QR code receiver 230 receives an image frame including the QR code through a camera of the user terminal 200 in step 403.

In step 404, the QR code recognizer 240 recognizes the QR code within the received image frame.

In step 405, the combination code generator 250 combines the extracted authentication code and the recognized QR code to generate the combination code used for the authentication.

The combination code transmitter 260 generates a response message including the generated combination code and transmits the generated response message to the authentication server 300 in step 406, and then terminates the authentication process in step 407.

As described above, according to an embodiment of the present invention, the user can perform a convenient and high-security authentication by recognizing the authentication code and the QR code included in the message and directly transmitting the combination code generated by combining the authentication code and the QR code to the authentication server, without an additional input by the user for the authentication.

Figure 5:
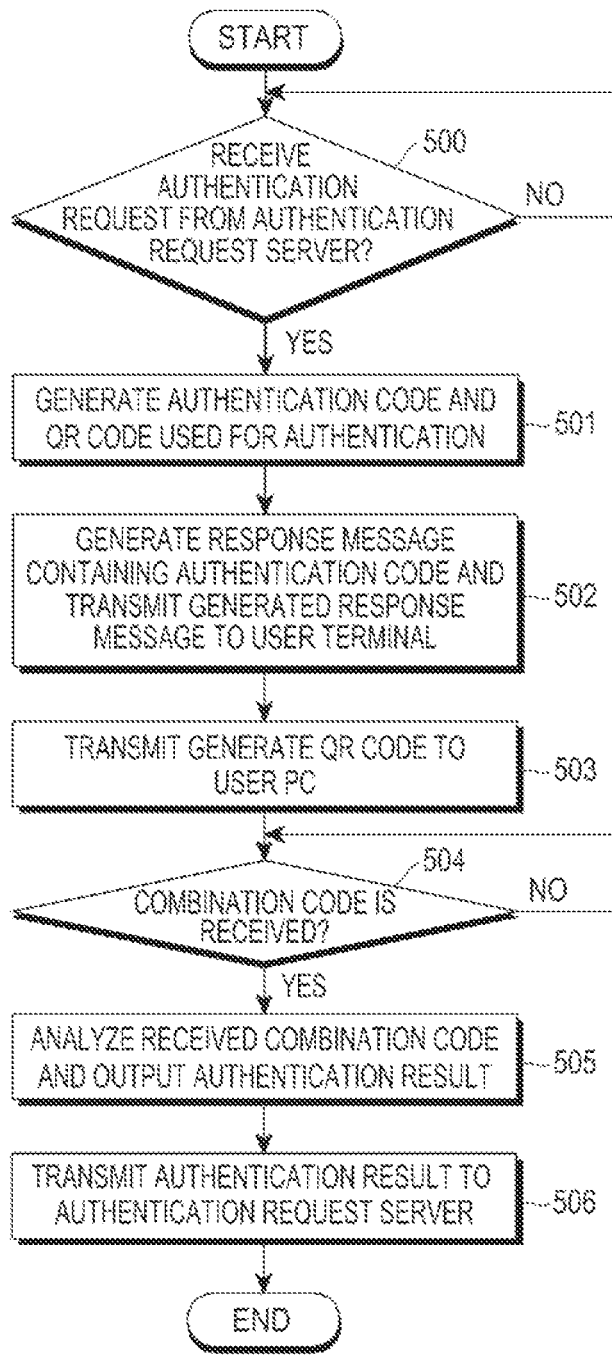
FIG. 5 is a flowchart illustrating a method for performing a combination code authentication in an authentication server according to an embodiment of the present invention.

FIG. 5 is a flowchart illustrating a process for performing a combination code authentication in an authentication server according to an embodiment of the present invention.

Referring to FIG. 5, the authentication request receiver 301 determines whether an authentication request is received from the authentication request server 10 in step 500. When the authentication request is received, in step 501, the authentication code generator 302 and the QR code generator 304 generate the authentication code and the QR code, respectively, which are used for the authentication.

The authentication code transmitter 303 generates the authentication message including the authentication code and transmits the generated authentication message to the user terminal 200 in step 502.

In step 503, the QR code transmitter 305 transmits the generated QR code to the user PC 100.

In step 504, the combination code receiver 306 determines whether the response message including the combination code is received from the user terminal 200. When the response message is received, the combination code analyzer 307 analyzes the received combination code and outputs the authentication result in step 505. Specifically, the combination code analyzer 307 outputs the authentication success indicator as the result, when the received combination code is generated by combining the generated authentication code and QR code, and outputs the authentication failure indicator as the result, when the received combination code is not generated by combining the generated authentication code and QR code. When the response message is not received for a predetermined time in step 504, a failure is output as the result.

In step 506, the analysis result transmitter 308 transmits the authentication result to the authentication request server 10.

As described above, according to an embodiment of the present invention, the user can perform a convenient and high-security authentication by recognizing the authentication code and the QR code including in the message and directly transmitting the combination code generated by combining the authentication code and the QR code to the authentication server, without an additional input by the user for the authentication.

According to an embodiment of the present invention, the message including the authentication code is transmitted to the user terminal and the QR code is transmitted to the user PC, such that the authentication code and the QR code are authenticated together, thereby improving security by using a heterogeneous network.

Further, according to an embodiment of the present invention, convenience is improved as the authentication of the combination code generated by combining the authentication code and the QR code is automatically performed without an additional input by the user for an input of the authentication code.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An apparatus for generating a combination code, the apparatus comprising:
   a receiver configured to receive an image frame including a Quick Response (QR) code used for authenticating a user of the apparatus and an authentication message including an authentication code used for authenticating the user of the apparatus;
   a processor configured to recognize the QR code within the image frame, extract the authentication code from the authentication message, and generate a combination code by combining the QR code and the authentication code, wherein the combination code is used for authenticating the user of the apparatus; and
   a transmitter configured to transmit the generated combination code to an authentication server,
   wherein the authentication code comprises at least one of a letter and a number.

2. The apparatus of claim 1, wherein the authentication message comprises a short-text message.

3. An apparatus for authenticating a combination code, the apparatus comprising:
   a processor configured to generate a Quick Response (QR) code and an authentication code which are used for authenticating a user, when an authentication request is received;
   a transmitter configured to transmit the QR code to a Personal Computer (PC) of the user and transmit an authentication message including the authentication code to a device of the user; and
   a receiver configured to receive a combination code used for authenticating the user and generated by the device of the user,
   wherein the processor determines whether the combination code is generated by combining the QR code and the authentication code, outputs an authentication result according to a result of the determination, and controls transmission of the authentication result to an authentication request server, wherein the authentication code includes at least one of a letter and a number.

4. The apparatus of claim 3, wherein the processor outputs an authentication success indicator as the authentication result, when the received combination code is generated by combining the QR code and the authentication code, and outputs an authentication failure indicator as the authentication result, when the received combination code is not generated by combining the QR code and the authentication code.

5. A method of generating a combination code in an apparatus, the method comprising:
   receiving an image frame including a Quick Response (QR) code used for authenticating a user of the apparatus and an authentication message including an authentication code used for authenticating the user of the apparatus;
   recognizing the QR code within the image frame and extracting the authentication code from the authentication message;
   generating a combination code by combining the QR code and the authentication code, wherein the combination code is used for authenticating the user of the apparatus; and
   transmitting the generated combination code to an authentication server, wherein the authentication code includes at least one of a letter and a number.

6. The method of claim 5, wherein the authentication message includes a short-text message.

7. A method of authenticating a combination code in an apparatus, the method comprising:
   receiving an authentication request;
   generating a Quick Response (QR) code and an authentication code which are used for authenticating a user;
   transmitting the QR code to a Personal Computer (PC) of the user and transmitting an authentication message including the authentication code to a device of the user;
   receiving a combination code used for authenticating the user and generated by the device of the user;
   determining whether the received combination code is generated by combining the QR code and the authentication code;
   outputting an authentication result according to a result of the determination; and
   transmitting the authentication result to an authentication request server, wherein the authentication code includes at least one of a letter and a number.

8. The method of claim 7, wherein outputting the authentication result comprises:
   outputting an authentication success indicator as the authentication result, when the received combination code is generated by combining the QR code and the authentication code; and
   outputting an authentication failure indicator as the authentication result, when the received combination code is not generated by combining the QR code and the authentication code.

* * * * *